United States Patent
Xie et al.

(10) Patent No.: US 11,220,617 B2
(45) Date of Patent: Jan. 11, 2022

(54) HIGH-SOLIDS CONTENT SOLVENT-BASED ADHESIVE COMPOSITIONS AND METHODS OF MAKING SAME

(71) Applicant: Dow Global Technologies LLC, Midland, MI (US)

(72) Inventors: Rui Xie, Pearland, TX (US); Mikhail Y. Gelfer, Sugarland, TX (US); Jonathan Barrus, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 166 days.

(21) Appl. No.: 16/316,926

(22) PCT Filed: May 22, 2017

(86) PCT No.: PCT/US2017/033722
§ 371 (c)(1),
(2) Date: Jan. 10, 2019

(87) PCT Pub. No.: WO2018/013220
PCT Pub. Date: Jan. 18, 2018

(65) Prior Publication Data
US 2019/0169477 A1    Jun. 6, 2019

Related U.S. Application Data

(60) Provisional application No. 62/360,659, filed on Jul. 11, 2016.

(51) Int. Cl.
| | | |
|---|---|---|
| C09J 175/06 | (2006.01) |
| C08G 18/10 | (2006.01) |
| C08G 18/12 | (2006.01) |
| C08G 18/80 | (2006.01) |
| C08G 18/32 | (2006.01) |
| C08G 18/76 | (2006.01) |
| C08G 18/28 | (2006.01) |
| C08G 18/06 | (2006.01) |
| C09J 183/00 | (2006.01) |
| C08G 18/00 | (2006.01) |
| C08G 71/04 | (2006.01) |
| C08G 18/72 | (2006.01) |
| C08G 18/42 | (2006.01) |
| C09J 175/08 | (2006.01) |
| C09J 11/06 | (2006.01) |

(52) U.S. Cl.
CPC ............ *C09J 175/06* (2013.01); *C08G 18/00* (2013.01); *C08G 18/06* (2013.01); *C08G 18/10* (2013.01); *C08G 18/12* (2013.01); *C08G 18/289* (2013.01); *C08G 18/3206* (2013.01); *C08G 18/4211* (2013.01); *C08G 18/72* (2013.01); *C08G 18/7671* (2013.01); *C08G 18/8029* (2013.01); *C08G 71/04* (2013.01); *C09J 11/06* (2013.01); *C09J 175/08* (2013.01); *C09J 183/00* (2013.01)

(58) Field of Classification Search
CPC ....... C09J 175/06; C09J 175/08; C08G 18/10; C08G 18/12; C08G 18/3206; C08G 18/289; C08G 18/4211
See application file for complete search history.

(56) References Cited

U.S. PATENT DOCUMENTS

| | | | | | |
|---|---|---|---|---|---|
| 5,998,538 | A | * | 12/1999 | Meckel | C08G 18/10 524/539 |
| 2009/0163673 | A1 | * | 6/2009 | Shah | C08G 18/6696 525/418 |
| 2011/0218275 | A1 | * | 9/2011 | Wu | C08G 18/10 524/72 |
| 2012/0021227 | A1 | * | 1/2012 | Kollbach | C08G 18/10 428/423.1 |

(Continued)

FOREIGN PATENT DOCUMENTS

| | | | | | |
|---|---|---|---|---|---|
| CA | 2378222 A1 | * | 1/2001 | ............. | C08G 18/10 |
| DE | 102008060885 A1 | | 6/2010 | | |

(Continued)

OTHER PUBLICATIONS

PCT/US2017/033722, International Search Report and Written Opinion dated Aug. 10, 2017.

(Continued)

*Primary Examiner* — Michael L Leonard
(74) *Attorney, Agent, or Firm* — William Hales

(57) ABSTRACT

A two-component adhesive composition is disclosed. The adhesive composition comprises an isocyanate component comprising an isocyanate-terminated prepolymer that is the reaction product of a polyisocyanate and an isocyanate reactive component having an average molecular weight less than 1,500. The NCO content of the isocyanate component without solvent is between 9 and 18%. The composition further comprises a polyol component comprising a polyester polyol having a molecular weight greater than 1,500 that is the reaction product of a polyhydric alcohol and a polybasic acid. The composition still further comprises an adhesion promoter. The average functionality of the adhesive composition is from 2 to 2.4. The adhesive composition provides for improved performance and processability at a solid content greater than 45 wt %. A methods of forming the adhesive composition is also disclosed. A laminate formed by this method is also disclosed.

17 Claims, No Drawings

(56) References Cited

U.S. PATENT DOCUMENTS

| | | | | | |
|---|---|---|---|---|---|
| 2012/0128991 | A1* | 5/2012 | Kollbach | ................ | B32B 27/32 |
| | | | | | 428/423.7 |
| 2013/0018146 | A1* | 1/2013 | Brinkman | .............. | C08G 18/12 |
| | | | | | 524/590 |
| 2014/0255560 | A1* | 9/2014 | Eklund | .................. | C08G 18/36 |
| | | | | | 426/106 |
| 2017/0121578 | A1* | 5/2017 | Garmann | .................. | B32B 7/12 |

FOREIGN PATENT DOCUMENTS

| | | |
|---|---|---|
| EP | 267193 A1 | 5/1988 |
| JP | 2003129024 A | 5/2003 |
| JP | 2013129779 A | 7/2013 |
| WO | 2015/168670 A1 | 11/2015 |

OTHER PUBLICATIONS

PCT/US2017/033722, International Preliminary Report on Patentability dated Jan. 24, 2019.

\* cited by examiner

HIGH-SOLIDS CONTENT SOLVENT-BASED ADHESIVE COMPOSITIONS AND METHODS OF MAKING SAME

REFERENCE TO RELATED APPLICATIONS

The present application claims the benefit of U.S. Provisional Application No. 62/360,659, filed on Jul. 11, 2016.

FIELD OF THE DISCLOSURE

The instant disclosure relates to adhesive compositions. More particularly, the disclosure relates to solvent-based, two-component adhesive compositions for use with laminate films, the compositions capable of running at 50% or more solids content and exhibiting improved processing characteristics including low viscosity and long pot life, and enhanced temperature and chemical resistance, and methods of making the same.

BACKGROUND AND SUMMARY OF THE DISCLOSURE

Adhesive compositions are useful for a wide variety of purposes. For instance, adhesive compositions are used to bond together substrates such as polyethylenes, polypropylenes, polyesters, polyamides, metals, papers, or cellophane to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Within the category of solvent-based laminating adhesives, there are many varieties. One particular variety includes two-component polyurethane-based laminating adhesives. Typically, a two-component polyurethane-based laminating adhesive includes a first component comprising an isocyanate and/or a polyurethane prepolymer and a second component comprising one or more polyols. A polyurethane prepolymer can be obtained by the reaction of a polyisocyanate with a polyether polyol and/or polyester polyol. The second component comprises polyether polyols and/or polyester polyols. Each component can optionally include one or more additives. Common solvents used in such systems include methyl ethyl ketone, ethyl acetate, toluene and the like, all of which must be moisture-free to prevent premature reaction of the isocyanate groups of the polyurethane.

The two components are combined in a predetermined ratio, thereby forming an adhesive composition. The adhesive composition, carried in a solvent, is then applied on a film/foil substrate. The solvent is evaporated from the applied adhesive composition. Another film/foil substrate is then brought into contact with the other substrate, forming a curable laminate structure. The laminate structure is cured to bond the two substrates together.

To achieve good green bond (i.e., early adhesive strength) and improved temperature and chemical resistance, high molecular weight polyester components, especially those containing aromatic moieties, are often used to boost performance in solvent-based adhesives. These high molecular weight polyester components are solid or viscous liquid at room temperature and, therefore, must be dissolved in a solvent such as ethyl acetate or methylethylketone for better processability. Typically, solvent-based adhesives contain about 70-80% solid, but they have to be diluted down to 30-40% solids when applied with state-of-the-art laminators.

The amount of solvent (accounting for 60-70% by weight) needed for achieving acceptable processing characteristics is disadvantageous in some aspects. For instance, the solvent has to be removed during the lamination process. The speed the solvent can be effectively removed dictates the line speed of the laminator. Higher solvent content, and lower solids content, implies lower line speed which is not desirable from a productivity point of view. Moreover, the solvent evaporated during fabrication of the laminates must be collected, recycled, and/or burned. Recycling results in additional costs and burning can negatively impact the environment. Still further, burning solvent is not efficient from a cost point of view.

Therefore, solvent-based adhesives capable of running at higher solids content while possessing good processing characteristics (e.g., low viscosity and extended pot life) and performance attributes (e.g., green bond and temperature and chemical resistance) are desirable.

While application at higher solids content is desirable, the practice has traditionally been limited because of increased viscosity and shortened pot life at higher running solids content for conventional solvent based adhesives. On the other hand, commercial solvent-based products capable of running at higher solid content (greater than 45%) often exhibit inadequate performance in green bond, temperature resistance, and chemical resistance. The challenge is achieving higher running solids content while minimizing tradeoffs and improving temperature and chemical resistance. Chemical and thermal resistance are particularly important concerns when the adhesives are used in food packaging, such as hot fill and retort applications.

The instant disclosure relates to a new class of solvent-based adhesives capable of running at 50% or more solids content. The new adhesives exhibit improved processing characteristics including low viscosity and long pot life, and enhanced temperature and chemical resistance. These desired performance attributes are achieved through a polyester/polyether hybrid system with balanced molecular weight distribution and functionality.

A two-component adhesive composition is disclosed. In some embodiments, the adhesive composition comprises an isocyanate component comprising an isocyanate-terminated prepolymer that is the reaction product of a polyisocyanate and an isocyanate reactive component that is a blend of polyether and/or polyester polyols having an average molecular weight less than 1,500, wherein the amount of the polyester polyol in the isocyanate reactive component is less than 50% by weight. In some embodiments, the NCO content of the isocyanate component is between 9 and 18%. In some embodiments, the composition further comprises a polyol component comprising a polyester polyol having a molecular weight greater than 1,500 that is the reaction product of a polyhydric alcohol and a polybasic acid. The polyester polyol comprises 30 weight percent (wt %) or more of the total weight of the polyol component. The composition still further comprises an adhesion promoter. The average functionality of the adhesive composition is greater than 2 but less than 2.41. The adhesive composition provides for improved performance and processability.

A method for forming a laminate is also disclosed. The method comprises forming an adhesive composition as described above, applying a layer of the adhesive composition to a surface of a film, bringing the layer into contact with a surface of another film to form a laminate, and curing the adhesive composition. A laminate formed by this method is also disclosed.

DETAILED DESCRIPTION OF THE DISCLOSURE

The two-component adhesive composition according to this disclosure comprises an isocyanate component and a polyol component. The components can be mixed to form a curable adhesive composition.

Isocyanate Component

The isocyanate component comprises an isocyanate-containing compound. The isocyanate-containing compound can be selected from the group consisting of an isocyanate monomer, a polyisocyanate (e.g., dimers, trimmers, etc.), an isocyanate prepolymer, and mixtures of two or more thereof. As used herein, a "polyisocyanate" is any compound that contains two or more isocyanate groups.

Further, the isocyanate-containing compound can be selected from the group consisting of aromatic polyisocyanates, aliphatic polyisocyanates, cycloaliphatic polyisocyanates, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate, 2,4-tolulene diisocyanate (2,4-TDI), 2,4'-diphenylmethane diisocyanate (2,4'-MDI), 4,4'-diphenylmethane diisocyanate, 3,3'-dimethyl-4,4'-biphenyldiisocyanate (TODI), polymeric isocyanates, and mixtures of two or more thereof.

Suitable aliphatic polyisocyanates have 3 to 16 carbon atoms, or 4 to 12 carbon atoms, in the linear or branched alkylene residue. Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate and diisocyanatodicyclohexylmethane ($H_{12}MDI$). Examples of aliphatic and cycloaliphatic polyisocyantes include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and mixtures of the of two or more thereof.

Additional isocyanate-containing compounds suitable for use according to this disclosure include 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

Suitable isocyanate prepolymers for use according to this disclosure are reaction products of a polyisocyanate and an isocyanate reactive component mixed at a stoichiometric ratio (NCO/OH) greater than 1.5, or from 2 to 6, or from 2.5 to 4. The polyisocyanate is selected from aromatic isocyanates, aliphatic isocyanates, cycloaliphatic isocyanates, and mixtures thereof, as described above. Suitable isocyanate reactive compounds that can react with polyisocyanates to form isocyanate prepolymers, also known as "polyurethane prepolymers," include compounds with hydroxyl groups, amino groups, and thio groups. Suitable isocyanate reactive compounds include polyesters, polycaprolactones, polyethers, polyacrylates, polycarbonates polyols, and combinations of two or more thereof. The average hydroxyl number for the isocyanate reactive component can be from 28 to 1,900 mg KOH/g and an average molecular weight less than 1,500 g/mol. The average OH number of the isocyanate reactive component can be from 56 to 560 mg KOH/g, or from 110 to 300 mg KOH/g, or from 125 to 250 KOH/g. The average functionality of the isocyanate reactive component can be from 1 to 6, or from 1.8 to 4, or from 2 to 3. The average molecular weight of the isocyanate reactive component can be up to 1,500 g/mol, or up to 1,000 g/mol, or from 250 to 1,000 g/mol.

Compounds having polyisocyanate groups, such as the isocyanate prepolymer of the isocyanate component, may be characterized by the parameter "% NCO" or by the term "NCO content," which is the amount of polyisocyanate groups by weight based on the weight of the compound. The parameter % NCO is measured by the method of ASTM D 2572-97(2010). The disclosed isocyanate component has a % NCO from 9 to 18%, or from 11 to 15%.

Polyol Component

The polyol component comprises a polyester polyol. In some embodiments, the polyester polyol accounts for at least 30 wt % of the polyol component, based on the dry weight of the polyol component. In some embodiments, the polyester polyol has a molecular weight greater than 1,500 g/mol, or greater than 2,500 g/mol, or from 1,500 g/mol to 4,500 g/mol.

Suitable polyester polyols include, but are not limited to, aliphatic polyester polyols, aromatic polyester polyols, copolymers of aliphatic and aromatic polyester polyols, polycarbonate polyols, and polycaprolactone polyols. These polyester polyols are the reaction products of polybasic acids and polyhydric alcohols, or the reaction of phosgene or a carbonate monomer with a polyhydric alcohol, or produced via ring opening polymerization of cyclic ester compounds.

Examples of suitable polybasic acids include succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2, 5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives or dimer acids of these dihydroxycarboxylic acids. These polybasic acids may be used alone or in combination.

Any known polyhydric alcohol can be used according to this disclosure. Non-limiting examples of suitable polyhydric alcohols include glycols such as ethylene glycol, propylene glycol, 1,3-propanediol, 1,4-butanediol, 1,5-pentanediol, 3-methyl-1,5-pentanediol, 1,6-hexanediol, neopentylglycol, methylpentanediol, dimethylbutanediol, butylethylpropanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, triethylene glycol, polycaprolactone diol, dimer diol, bisphenol A, and hydrogenated bisphenol A; polyesters produced through ring opening polymerization of cyclic ester compounds, such as propiolactone, butyrolactone, ε-caprolactone, δ-valerolactone, and β-methyl-δ-valerolactone; and polyethers produced from addition polymerization of one or more monomers including ethylene oxide, propylene oxide, butylene oxide, styrene oxide, epichlorohydrin, tetrahydrofuran, and cyclohexylene in the usual manner with the aid of one or more compounds containing two active hydrogen atoms as an initiator, e.g., ethylene glycol, diethylene glycol, triethylene glycol, propylene glycol, trimethylene glycol, 1,3-butanediol, 1,4-butanediol, 1,6-hexanediol, and neopentylglycol. These polyhydric alcohols may be used alone or in combination.

Furthermore, the polyol component may contain polyether polyols. Suitable polyether polyols include but not limited to polypropylene glycols, polytetramethylene ether glycols, polybutylene oxide based polyols, or mixtures and copolymers of them. Suitable polypropylene glycols include polyols based on propylene oxide, ethylene oxide, or mixture of them with initiators selected from propylene glycol, dipropylene glycol, sorbitol, sucrose, glycerin, and/or mixtures of them, available from the Dow Chemical Company under the trade name of VORANOL™, the BASF Company under the trade name of PLURACOL™, Lonza under trade name POLY-G™, POLY-L™, and POLY-Q™, and Covestro under the trade name ACCLAIM™. In particular, polypropylene glycols with functionality between 2 to 6 and molecular weight from 250 to 1500 are preferred. Suitable polytetramethylene ether glycols include but not limited to POLYTHF™ from the BASF Company, TERTHANE™ from Invista, PTMG™ from Mitsubishi, and PTG™ from Dairen. Suitable polybutylene oxide based polyols include but not limited to polybutylene oxide homopolymer polyols, polybutylene oxide-polypropylene oxide copolymer polyols, and polybutylene oxide-polyethylene oxide copolymer polyols.

In addition, low molecular weight glycols, including but not limited to ethylene glycol, diethylene glycol, triethylene glycol, propylene glycol, trimethylene glycol, 1,3-butanediol, 1,4-butanediol, 1,6-hexanediol, trimethylolpropane, triisopropanolamine, and neopentylglycol can be incorporated in the polyol component.

Adhesive Composition

The isocyanate and polyol components can be mixed to form a curable adhesive composition. In some embodiments, the adhesive composition further comprises an adhesion promoter. Non-limiting examples of suitable adhesion promoters include coupling agents such as a silane coupling agent, a titanate coupling agent, and an aluminate coupling agent; epoxy resin, phosphoric acid, polyphosporic acid, and phosphate esters.

Examples of the silane coupling agent include, but are not limited to, aminosilanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyl dimethoxysilane, and N-phenyl-γ-aminopropyltrimethoxysilane; epoxysilane such as β-(3,4-epoxycyclohexyl)-ethyltrimethoxysilane, γ-glycidoxypropyltrimethoxysilane, and γ-glycidoxypropyltriethoxysilane; vinylsilane such as vinyl tris(β-methoxyethoxy)silane, vinyltriethoxysilane, vinyltrimethoxysilane, and γ-methacryloxypropyltrimethoxysilane; hexamethyldisilazane; and γ-mercaptopropyltrimethoxysilane.

Examples of the titanate coupling agent include, but are not limited to, tetraisopropoxy titanium, tetra-n-butoxy titanium, butyl titanate dimer, tetrastearyl titanate, titanium acetylacetonate, titanium lactate, tetraoctyleneglycol titanate, titanium lactate, and tetra stearoxy titanium.

Examples of the epoxy resin include, but are not limited to, a variety of commercially available epoxy resins such as bisphenol A-epichlorohydrin (epi-bis) type epoxy resin, novolak type epoxy resin, β-methylepichlorohydrin type epoxy resin, cyclic oxirane type epoxy resin, glycidyl ether type epoxy resin, glycidyl ester type epoxy resin, polyglycol ether type epoxy resin, glycol ether type epoxy resin, epoxidation fatty acid ester type epoxy resin, polycarboxylic acid ester type epoxy resin, aminoglycidyl type epoxy resin, and resorcin type epoxy resin.

In some embodiments, the adhesion promoter is a phosphate ester compound. In other embodiments, the adhesion promoter is an epoxy silane ((3-glycidyloxypropyl)trimethoxysilane). In some embodiments, phosphoric acid is incorporated in the polyol component while epoxy silane is incorporated in the isocyanate component. In some embodiments, both epoxy silane and phosphoric are incorporated in the polyol component.

In some embodiments, the average functionality of the adhesive composition (i.e., the isocyanate component together with the polyol component), excluding non-reactive components such as solvents, is greater than 2 but less than 2.41. Calculation of the average functionality is discussed below.

It is contemplated that the isocyanate component and the polyol component of the disclosed adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together, typically at a stoichiometric ration (NCO/OH) between 1 and 2.5. Solvents, such as ethyl acetate and methyl ether ketone are added to the mixture to aid processability. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. In some embodiments, the adhesive composition, such as the adhesive composition discussed above, is in a liquid state at 25° C. Even if the composition is solid at 25° C., it is acceptable to heat the composition as necessary to put it in a liquid state. Solvent is added to the mixed adhesive composition until the desired solids content is reached. In many of the Illustrative Examples discussed below, a solids content of 50% or greater is demonstrated.

A layer of the composition is applied to a surface of a film. A "film" is any structure that is 0.5 mm or less in one dimension and is 1 cm or more in both of the other two dimensions.

A polymer film is a film that is made of a polymer or mixture of polymers. The composition of a polymer film is, typically, 80 percent by weight or more by weight one or more polymers. In some embodiments, the thickness of the layer of the curable mixture is 1 to 5 μm.

In some embodiments, a surface of another film is brought into contact with the layer of the curable mixture to form an uncured laminate. The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymer, and metalized polymer films. Films optionally have a surface on which an image is printed with ink. The ink may be in contact with the adhesive composition. In some embodiments, the films are polymer films and metal-coated polymer films, more preferred are polymer films.

EXAMPLES OF THE DISCLOSURE

The present disclosure will now be explained in further detail by Illustrative Examples and Comparative Examples (collectively, "the Examples"). However, the scope of the present disclosure is not, of course, limited to the formulations set forth in the examples. Rather, the Examples are merely illustrative of the disclosure.

Bond Strength Measurement

A 90° T-peel test is performed on laminate samples cut to 15 mm or 25.4 mm (1 inch) wide strips and pulled on a THWING ALBERT™ QC-3A peel tester equipped with a 50N loading cell at a rate of 10 inch/min on 1 inch strips. When the two films forming the laminate separate, i.e., peel, the average of the force during the pull is recorded. If one of the films stretches or breaks, the maximum force or force at break is recorded. The value recorded is the average of testing performed on three separate laminate samples.

The failure mode ("FM") or mode of failure ("MOF") is recorded as follows: "FS" indicates a film that stretches; "FT" indicates a film that tears or breaks; "AF" indicates adhesive failure, wherein adhesive on a primary film fails to adhere to a secondary film; "AT" indicates adhesive transfer, wherein adhesive fails to adhere to the primary film and is transferred to the secondary film; "AS" indicates adhesive split or cohesive failure, wherein adhesive is found on both primary and secondary film; "MT" indicates transfer of metal from a metalized film to a secondary film ("PMT" indicates partial metal transfer).

The initial bonds, or "green" bonds, are tested as soon as possible after the laminate is made. Additional T-peel tests are conducted at time intervals as indicated below, such as after one day and after seven days.

Boil-in-Bag Test Procedure

Laminates are made from the "prelam" film, Prelam Al, and GF-19, as well as 92-LBT and GF-19, as described below. A 9"×12" (23 cm×30.5 cm) sheet of laminate is folded over to give a double layer of about 9"×6" (23 cm×15.25 cm) such that the polyethylene film of one layer is in contact with the polyethylene film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kPa (40 psi). More than one pouch is made for each test.

The pouches are filled through the open side with 100±5 ml of "1:1:1 sauce" (blend of equal parts by weight of ketchup, vinegar, and vegetable oil). During filling, splashing the sauce onto the heat seal area is avoided as this can cause the heat seal to fail during the testing. After filling, the top of the pouch is sealed in a manner that minimizes air entrapment inside of the pouch.

The seal integrity is inspected on all four sides of each pouch to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

A pot is filled two-thirds full with water which is brought to a rolling boil. After boiling is achieved, the pot is covered with a lid to minimize water and steam loss. The pot is observed during the test to ensure that there is enough water present to maintain boiling. The pouches are placed in the boiling water and kept boiling for thirty minutes. The pouches are removed and the extent of tunneling, blistering, de-lamination, and/or leakage is compared with the marked preexisting flaws, if any. The observations are recorded. The pouches are then cut open, emptied, and rinsed with soap and water. One or more 1" (2.54 cm) strips are cut from the pouches and the laminate bond strength is measured according to the standard bond strength test described previously. This is done as soon as possible after removing the pouch contents. The interiors of the pouches are examined and any other visual defects are recorded.

Chemical Aging Test Procedure

Laminates are made from the "prelam" film, Prelam Al, and GF-19, as well as Prelam Al/cast polypropylene, as described below. A 9"×12" (23 cm×30.5 cm) sheet of laminate is folded over to give a double layer about 9"×6" (23 cm×15.25 cm) such that the polyethylene film of one layer is in contact with the polyethylene film of the other layer. The edges are trimmed on a paper cutter to give a folded piece about 5"×7" (12.7×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kpa (40 PSI). More than one pouch is made for each test.

The pouches are filled through the open edge with 100±5 ml of "1:1:1 sauce" (blend of equal parts by weight of ketchup, vinegar, and vegetable oil). During filling, splashing the 1:1:1 sauce onto the heat seal area is avoided as this can cause the heat seal to fail during testing. After filling, the top of the pouch is sealed in a manner that minimizes air entrapment inside of the pouch.

The seal integrity is inspected on all four sides of pouches to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

The pouches containing the 1:1:1 sauce are placed in an convection oven set at 50° C. for 100 hours. The pouches are removed after aging and the extent of tunneling, blistering, de-lamination, and/or leakage is compared with any of the marked preexisting flaws. The observations are recorded. The pouches are cut open, emptied, and rinsed with soap and water. One or more 1" (2.54 cm) strips are cut from the pouches and the laminate bond strength is measured according to the standard bond strength test described earlier. This is done as soon as possible after removing the pouch contents. The interiors of the pouches are examined and any other visual defects are recorded.

Softener Test Procedure

Laminates are made from the "prelam" film, Prelam Al and GF-19, as well as 92-LBT and GF-19, that was described below. A 9"×12" (23 cm×30.5 cm) sheet of laminate is folded over to create a double layer of about 9"×6" (23 cm×15.25 cm) such that the polyethylene film of one layer is in contact with the polyethylene film of the other layer. The edges are trimmed on a paper cutter to give a folded piece of about 5"×7" (12.7×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kPa (40 psi). More than one pouch is made for each test.

The pouches are filled through the open side with 100±5 ml of softener purchased from a supermarket, this instance Purex Mountain Breeze Ultra made by The Dial Corporation, a Henkel Company. After filling, the top of the pouch is sealed in a manner that minimizes air entrapment inside of the pouch.

The seal integrity is inspected on all four sides of the pouches to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

The pouches are then placed in a convection oven preset at 65° C. After aging at the temperature for thirty days, the pouches are removed and the extent of tunneling, blistering, de-lamination, and/or leakage was compared with the marked preexisting flaws, if any. The observations are recorded. The pouches are then cut open, emptied, and rinsed with soap and water. One or more 1" (2.54 cm) strips are cut from the pouches and the laminate bond strength is measured according to the standard bond strength test described previously. This is done as soon as possible after removing the pouch contents. The interior of the pouches are examined and any other visual defects are recorded.

Retort Test Procedure

Laminates were made from the "prelam" film, Prelam Al, and cast polypropylene, that were described below. One of the 9"×12" (23 cm×30.5 cm) sheet of laminate is folded over to give a double layer of about 9"×6" (23 cm×15.25 cm) such that the polyethylene film of one layer is in contact with the polyethylene film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kpa (40 PSI). More than one pouch is made for each test.

During filling, splashing the 1:1:1 sauce onto the heat seal area is avoided as this can cause the heat seal to fail during testing. After filling, the top of the pouch is sealed in a manner that minimizes air entrapment inside of the pouch.

The seal integrity is inspected on all four sides of pouches to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

The pouches containing the 1:1:1 sauce are placed in a retort chamber set at 121° C. for 2 hours. The pouches are removed and the extent of tunneling, blistering, de-lamination, and/or leakage was compared with any of the marked preexisting flaws. The observations are recorded. The pouches are cut open, emptied, and rinsed with soap and water. One or more 1" (2.54 cm) strips are cut from the pouches and the laminate bond strength is measured according to the standard bond strength test described earlier. This is done as soon as possible after removing the pouch contents. The interiors of the pouches are examined and any other visual defects were recorded.

Theoretical Functionality of the Adhesive Compositions

Theoretical functionality ($f_{average}$) is defined as: $f_{average} = (m_1 \cdot f_1 + m_2 \cdot f_2 + m_3 \cdot f_3 + \ldots)/(m_1 + m_2 + m_3 + \ldots)$, where $m_1$, $m_2$, $m_3$ are the mass of the components in mole, and $f_1$, $f_2$, and $f_3$ the functionality of the components. The theoretical functionality of the adhesive compositions excludes non-reactive components of the adhesive compositions, e.g., solvents. For example, in the Illustrative Example 1 discussed below, the isocyanate component has an average functionality of 2.17 and an average molecular weight of 762, and the polyol component has an average functionality of 2.11 and an average molecular weight of 2,960. When 1,650 grams of the polyol component is mixed with 660 grams of the isocyanate component, the average functionality of the adhesive is: $f_{average} = (660/762 \cdot 2.17 + 1650/2,960 \cdot 2.11)/(660/762 + 1,650/2,960) = 2.15$.

Composition Preparation

Some of the raw materials used to prepare the Examples are identified in Table 1 below by name, general description, and commercial supplier.

TABLE 1

Raw Materials

| Name | Description | Commercial Supplier |
|---|---|---|
| INTERMEDIATE™ 88X102 | 2,000 molecular weight polyester polyol | The Dow Chemical Company |
| ADCOTE™ L86-116 | 3,000 molecular weight polyester polyol based on phthalic anhydride | The Dow Chemical Company |
| ADCOTE™ L87-118 | Phosphate ester with 75% solids content | The Dow Chemical Company |
| VORANOL™ CP 450 | 450 molecular weight glycerine propoxylated polyether triol | The Dow Chemical Company |
| MOR-FREE™ C117 | 650 molecular weight branched polyester polyol with an average functionality of 2.15 | The Dow Chemical Company |
| Trimetholopropane ("TMP") | 135 molecular weight triol | Sigma-Aldrich Corporation |
| Phosphoric acid | Phosphoric acid 85% solution in water | Sigma-Aldrich Corporation |
| ISONATE™ 125M | 4,4'-methylenediphenyl diisocyanate | The Dow Chemical Company |
| ISONATE™ 143L | 4,4'-methylenediphenyl diisocyanate | The Dow Chemical Company |
| VORANOL™ 220-260 | 400 molecular weight diol based on polypropylene oxide | The Dow Chemical Company |
| POLYG™ 30-112 | 1,500 molecular weight triol based on polypropylene oxide | Arch Chemicals |
| GLYMO™ | (3-glycidyloxypropyl)trimethoxy-silane oxide | Evonik Industries |

TABLE 1-continued

Raw Materials

| Name | Description | Commercial Supplier |
|---|---|---|
| Prelam AL Film | Polyethylene terephthalate film having thickness of 12 µm laminated to soft lamination grade AMCOR ™ aluminum foil having thickness of 9 µm with ADCOTE ™ 550/ COREACTANT F | AMPAC Company |
| GF-19 Film | Polyethylene sealant film containing slip additives | Berry Plastics Corporation |
| EMBLEM ™ 1500 | Polyamide film having thickness of 20 µm | E. I. du Pont de Nemours and Company |
| FT 600-92g | Metalized poly(ethylene glycol-terephthalate) film having thickness of 23 µm and a 0.02 µm aluminum layer on the PET side | FILMtech Inc. |
| 4 mil LLDPE | Polyethylene film at 4 mm thickness | Berry Plastics Corporation |

Illustrative Example 1 ("IE1")

Isocyanate Component

A lab glass reactor consisting of a 4-neck flask equipped with a mechanical stirrer and a temperature controller is used to produce the isocyanate component. Under nitrogen purge, 390.2 grams of ISONATE™125M premelted at 45° C. is first loaded to the flask. The reactor temperature is set to 50° C. With agitation on, 190.9 grams of ISONATE™143L is charged to the reactor followed by 0.2 grams of phosphoric acid. After mixing for 10 minutes, 167.8 grams of VORNAOL™ 220-260 is added to the reactor. Cooling is applied if the temperature exceeds 75° C. After the reactor temperature cools down to between 50 and 60° C., 75.7 grams of VORANOL™ CP 450 is charged to the reactor. After reacting at 75° C. for 2 hours, 150.5 grams of ethyl acetate is added to the reactor, followed by 0.3 grams of phosphoric acid, and 24.4 grams of GLYMO™. After 2 more hours at 75° C., a clear, low viscosity prepolymer is obtained, the prepolymer having a NCO content of 11.96%, a solid content at 85%, a room temperature viscosity of 680 cps, and a theoretical functionality of 2.17. NCO content is measured according to ASTM D 2572-97 and viscosity is measured with a Brookfield DV-II viscometer at a given temperature. Solids content is measured by a HR 73 Halogen Moisture Analyzer, nd OH number is determined by a Metrohm titrator.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 316 grams of INTERMEDIATE™ 88X102 is charged to the reactor, followed by the addition of 0.6 grams of phosphoric acid, 5 grams of TMP premelted at 65° C., 600 grams of ADCOTE™ 86-116, and 84 grams of ethyl acetate. The reactor temperature is then increased to 75° C. After mixing at 75° C. for 45 minutes, a clear, low viscosity liquid is obtained, the liquid having a solids content of 76.9%, an OH number of 40, a room temperature viscosity of 890 cps, and an average theoretical functionality of 2.11. Viscosity is measured with a Brookfield DY-II viscometer at a given temperature, solids content is measured by a HR 73 Halogen Moisture Analyzer, and OH number is determined by a Metrohm titrator.

Laminate Structure 660 grams of the isocyanate component above, 1,650 grams of the polyol component above, and 1,350 grams of ethyl acetate are mixed to form a 50% solid adhesive composition at a NCO/OH index of 1.53. The average functionality of the adhesive composition is 2.15. The adhesive composition is then applied to a pre-laminated aluminum foil at a coat weight of 1.7 lb/ream, followed by laminating it with a low density polyethylene film (GF-19) using a Nordmeccanica LABO-COMBI™ laminator. Bond strength of the laminate structure is measured immediately after the lamination (i.e., green bond) and in intervals of 1 day, 7 days, and 14 days after the lamination according to the test protocol described earlier. After 14 days, the laminate structure is subjected to the boil-in-bag and 1:1:1 sauce aging tests described earlier. After the boil-in-bag and 1:1:1 sauce aging test, the pouches are cut open, washed clean, and examined for failure modes. Bond strength of the laminate is measured and recorded. Results on bond strength and failure mode of the laminate structure are summarized in Table 2.

Illustrative Example 2 ("IE2")

Illustrative Example 1 is repeated, but the substrates are changed. The adhesive composition in Example 1 is first applied to a metalized polyethylene terephthalate film at a coat weight of 1.7 lb/ream, followed by laminating it with a polyamide film using a Nordmeccanica LABO-COMBI™ pilot laminator. The resulting laminate is left in a 60° C. oven for 1 hour before it is used as a primary substrate and the same adhesive is applied to the PET side of the laminate using the Nordmeccanica LABO-COMBI™, then laminated with a 4 mil low density polyethylene film. The bond strength between the low density polyethylene and the PET is measured immediately after the lamination and in intervals of 1 day, 7 days, and 14 days after the lamination. After 14 days, pouches are made using the laminate structure and then filled with a commercial softener. The pouches are then placed in an oven preset at 65° C. for 30 days before being cut open, washed clean, and examined for failure modes. Bond strength of the laminate after the aging test is measured and recorded. Results on bond strength and failure mode of the laminate structure are summarized in Table 2.

Illustrative Example 3 ("IE3")

The isocyanate component is the same from Illustrative Example 1. The polyol component is prepared by mixing 316 grams of INTERMEDIATE™ 88X102, 0.6 grams of phosphoric acid, 6.75 grams of TMP, 600 grams of ADCOTE™ 86-116, and 85.75 grams of ethyl acetate. The mixture is found to have a solids content of 75.9%, a hydroxyl number of 41, a room temperature viscosity of 905, and an average theoretical functionality of 2.19.

1,690 grams of the polyol component, 670 grams of the isocyanate component of Illustrative Example 1, and 1,345 grams of ethyl acetate are mixed to form a 50% solid solution with a NCO/OH index of 1.47. The average theoretical functionality of the adhesive is 2.16. The solution is then applied to a pre-laminated aluminum foil at a coat weight of 1.7 lb/ream, followed by laminating it with a low density polyethylene film (GF-19) using a Nordmeccanica LABO-COMBI™ laminator. The laminate structure is subjected to the same tests described in Illustrative Example 1 and the results are summarized in Table 2.

Illustrative Example 4 ("IE4")

Isocyanate Component

A lab glass reactor consisting of a 4-neck flask equipped with a mechanical stirrer and a temperature controller is used to produce the isocyanate component. Under nitrogen purge, 196.9 grams of ISONATE™ 125M premelted at 45° C. is first loaded to the flask. The reactor temperature is set to 50° C. With agitation on, 402.4 grams of ISONATE™ 143L is charged to the reactor followed by 0.2 grams of phosphoric acid. After mixing for 10 minutes, 173.0 grams of VORANOL™ 220-260 is added to the reactor. Cooling is applied if the temperature exceeds 75° C. After the reactor temperature cools down to between 50 and 60° C., 78.1 grams of VORANOL™ CP 450 is charged to the reactor. After reacting at 75° C. for 2 hours, 149.4 grams of ethyl acetate is added to the reactor. After mixing at 75° C. for 0.5 more hours, a clear, low viscosity prepolymer is obtained, the prepolymer having a NCO content of 12.4%, a solids content at 84%, a room temperature viscosity of 690 cps, and a theoretical functionality of 2.17.

Polyol Component

A lab glass reactor consisting of a 4-neck flask equipped with a mechanical stirrer and a temperature controller is used to produce the polyol component. The reactor temperature is set to 65° C. Under nitrogen purge and with agitation on, 316 grams of INTERMEDIATE™ 88X102 is charged to the reactor, followed by the addition of 0.6 grams of phosphoric acid, 5 grams of TMP premelted at 65° C., 600 grams of ADCOTE™ 86-116, and 84 grams of ethyl acetate. The reactor temperature is then raised to 75° C. After mixing at 75° C. for 45 minutes, the reactor temperature is reduced to 65° C. 7 grams of GLYMO™ is then charged to the reactor. After mixing at 65° C. for another 30 minutes, a clear, low viscosity liquid is obtained, the mixture having a solids content of 76.7%, an OH number of 40, a room temperature viscosity of 870 cps, and an average theoretical functionality of 2.11.

Laminate Structure 662 grams of the isocyanate component, 1,558 grams of the polyol component, and 1266 grams of ethyl acetate are mixed to form a 50% solids adhesive composition at a NCO/OH index 1.54. The average functionality of the adhesive composition is 2.15. The solution is then applied to a pre-laminated aluminum foil at a coat weight of 1.65 lb/ream, followed by laminating it with a low density polyethylene film (GF-19) using a Nordmeccanica LAB 0-COMBI™ laminator. The laminate structure is then subjected to the same tests described in Illustrative Example 1. Results on bond strength and failure mode of the laminate structure are summarized in Table 2.

Comparative Example 1 ("CE1")

The isocyanate component is kept the same as in Illustrative Example 1. The polyol component is prepared by mixing 280 grams of INTERMEDIATE™ 88X102, 0.6 grams of phosphoric acid, 150 grams of TMP, 500 grams of ADCOTE™ 86-116, and 70 grams of ethyl acetate. The mixture is found to have a solids content of 80%, a hydroxyl number of 217, a room temperature viscosity of 1,050 cps, and an average theoretical functionality of 2.80.

1,000 grams of the polyol component is mixed with 1,620 grams of the isocyanate component of Illustrative Example 1 and 1,615 grams of ethyl acetate to form a 50% solids solution with a NCO/OH index of 1.54. The average theoretical functionality of the adhesive is 2.41. The solution is then applied to a pre-laminated aluminum foil at a coat weight of 1.8 lb/ream, followed by laminating it with a low density polyethylene film (GF-19) using a Nordmeccanica LABO-COMBI™ laminator. The laminate structure is subjected to the same tests described in Illustrative Example 1 and the results are summarized in Table 2.

Illustrative Example 5 ("IE5")

The isocyanate component is kept the same as in Illustrative Example 4. The polyol component is prepared by mixing 316 grams of INTERMEDIATE™ 88X102, 74.6 grams of ADCOTE™ L87-118, 5 grams of TMP, 525 grams of ADCOTE™ 86-116, and 79 grams of ethyl acetate using a procedure similar to that of Illustrative Example 1. The mixture is found to have a solids content of 77.4%, an OH number of 48, a room temperature viscosity of 1,050 cps, and an average theoretical functionality of 2.25.

560 grams of the isocyanate component above, 1,700 grams of the polyol component, and 1,324 grams of ethyl acetate are mixed to form a 50% solids solution with a NCO/OH index of 1.15. The average functionality of the adhesive composition is 2.21. The solution is then applied to a pre-laminated aluminum foil at a coat weight of 1.8 lb/ream, and followed by laminating it with a low density polyethylene film (GF-19) using a Nordmeccanica LABO-COMBI™ laminator. Bond strength of the laminate structure is measured immediately after the lamination and in intervals of 1 day, 7 days, and 14 days after the lamination according to the test protocol described earlier. After 14 days, the laminate structure is subjected to the boil-in-bag and 1:1:1 sauce aging test described earlier. After the boil-in-bag, and 1:1:1 sauce aging tests, the pouches are cut open, washed clean, and examined for failure modes. Bond strength of the laminate is measured and recorded. Results on bond strength and failure mode of the laminate structure are summarized in Table 2.

Illustrative Example 6 ("IE6")

Illustrative Example 5 is repeated but the secondary film is replaced. The adhesive is applied to a pre-laminated aluminum foil at a coat weight of 1.80 lb/ream, followed by laminating it with a 2 mil cast polypropylene film. The laminate structure is subjected to the same tests described in Illustrative Example 1 and retort testing described earlier. Results on bond strength and failure modes of the laminate structure are summarized in Table 2.

Illustrative Example 7 ("IE7")

Illustrative Example 5 is repeated but the substrates are changed. The mixed adhesive in Illustrative Example 5 is first applied to a metalized polyethylene terephthalate film at a coat weight of 1.80 lb/ream, followed by laminating it with a polyamide film using a Nordmeccanica LABO-COMBI™ pilot laminator. The resulting laminate is left in a 60° C. oven for 1 hour before it is used as a primary substrate and the same adhesive is applied to the PET side of the laminate using the Nordmeccanica LABO-COMBI™, then laminated with a 4 mil low density polyethylene film. The bond strength between the polyethylene and the PET is measured immediately after the lamination and in intervals of 1 day, 7 days, and 14 days after the lamination. After 14 days, pouches are made using the laminate structure and filled with a commercial softener. The pouches are then placed in an oven preset at 65° C. for 30 days before they are cut open, washed clean, and examined for failure modes. Bond strength of the laminate after the aging test is measured and recorded. Results on bond strength and failure mode of the laminate structure are summarized in Table 2.

Illustrative Example 8 ("IE8")

616 grams of the isocyanate component in Illustrative Example 4, 1,600 grams of the polyol component in Illustrative Example 5, and 1,308 grams of ethyl acetate are mixed to form a 50% solids solution with a NCO/OH index of 1.35. The average functionality of the adhesive is 2.20. The solution is then applied to a pre-laminated aluminum foil at a coat weight of 1.65 lb/ream, followed by laminating it with a low density polyethylene film (GF-19) using a Nordmeccanica LABO-COMBI™ laminator. The laminate structure is then subjected to the same tests described in Illustrative Example 1. Results and failure modes of the laminate structure are summarized in Table 2.

Illustrative Example 9 ("IE9")

Illustrative Example 8 is repeated but the secondary film is replaced. The adhesive composition is applied to a pre-laminated aluminum foil at a coat weight of 1.65 lb/ream, followed by laminating it with a 2 mil cast polypropylene film. The laminate structure is subjected to the same tests described in Illustrative Example 1 and retort testing. Results on bond strength and failure modes of the laminate structure are summarized in Table 2.

Illustrative Example 10 ("IE10")

Illustrative Example 8 is repeated but the substrates are changed. The mixed adhesive in Illustrative Example 9 is first applied to a metalized polyethylene terephthalate film at a coat weight of 1.65 lb/ream, followed by laminating it with a polyamide film using a Nordmeccanica LABO-COMBI™ pilot laminator. The resulting laminate is left in a 60° C. oven for 1 hours before it is used as a primary substrate and the same adhesive is applied to the PET side of the laminate using the Nordmeccanical LABO-COMBI™, then laminated with a 4 mil low density polyethylene film. The bond strength between the polyethylene and the PET is measured immediately after the lamination and in intervals of 1 day, 7 days, and 14 days after the lamination. After 14 days, pouches are made using the laminate structure and filled with a commercial softener. The pouches are then placed in an oven preset at 65° C. for 30 days before they are cut open, washed clean, and examined for failure modes. Bond strength of the laminate after the aging test is measured and recorded. Results on bond strength and failure mode of the laminate structure are summarized in Table 2.

Comparative Example 2

Isocyanate Component

A lab glass reactor consisting of a 4-neck flask equipped with a mechanical stir and a temperature controller is used to produce the isocyanate component. Under nitrogen purge, 657.0 grams of ISONATE™ 125M premelted at 45° C. is first loaded to the flask. The reactor temperature is set to to 50° C. With agitation on, 0.01 grams of benzoyl chloride is added to the reactor, followed by the addition of 343.0 grams of VORANOL™ 220-260 is added to the reactor. Cooling is applied if the temperature exceeds 75° C. After reacting at 75° C. for three hours, 176.5 grams of ethyl acetate is added to the reactor. After mixing at 75° C. for an additional 0.5 hour, a clear, low viscosity prepolymer is obtained having a NCO content of 12.50%, a solids content at 85%, a room temperature viscosity of 645 cps, and a theoretical functionality of 2.0.

Laminate Structure 396 grams of the Isocyanate Component above, 1,650 grams of ADCOTE 86-116, and 1,450 grams of ethyl acetate were mixed to form a 50% solid solution at NCO/OH index 1.34. The average functionality of the adhesive was 2.08. The solution was then applied to a pre-laminated aluminum foil at a coat weight of 1.7 lb/ream, and followed by laminating it with a low density polyethylene film (GF-19) using a Nordmeccanica Labocombi laminator. Bond strength of the laminate structure was measured immediately after the lamination (green bond) and in intervals of 1 day, 7 days, and 14 days after the lamination according to the test protocol described earlier. After 14 days, the laminate structure was subjected to the boil-in-bag and 1:1:1 sauce aging test described earlier. After the boil-in-bag and 1:1:1 sauce aging test, the pouches were cut open, washed clean, and examined for failure modes. Bond strength of the laminate was measured and recorded. Results on bond strength and failure mode of the laminate structure were summarized in Table 2.

TABLE 2

Performance Results for IE1-IE10, CE1, and CE2

| | Example 1 | Example 2 | Example 3 | Example 4 | Example 5 | Example 6 |
|---|---|---|---|---|---|---|
| Isocyanate Component | | | | | | |
| NCO content, % | 11.96 | 11.96 | 11.96 | 12.4 | 12.4 | 12.4 |
| Equivalent weight of the polyol blend | 186 | 186 | 186 | 186 | 186 | 186 |
| Polyester content in the polyol blend, | <50% | <50% | <50% | <50% | <50% | <50% |
| Polyol Component | | | | | | |
| Equivalent weight of polyester component(s) | 1219 | 1219 | 1219 | 1219 | 1211 | 1211 |
| Polyester content | >50% | >50% | >50% | >50% | >50% | >50% |
| Adhesion Promoters | GLYMO | GLYMO | GLYMO | GLYMO | Phosphate ester | Phosphate ester |

TABLE 2-continued

Performance Results for IE1-IE10, CE1, and CE2

| Adhesive Properties | | | | | | |
|---|---|---|---|---|---|---|
| NCO/OH Index | 1.53 | 1.53 | 1.47 | 1.54 | 1.15 | 1.15 |
| Theoretical functionality | 2.15 | 2.15 | 2.16 | 2.15 | 2.21 | 2.21 |
| Solid Content, % | 50 | 50 | 50 | 50 | 50 | 50 |
| Initial Viscosity by Zahn Cup #2, seconds | 13.8 | 13.8 | 13.8 | 13.8 | 14.7 | 14.7 |
| Potlife, hours | >24 | >24 | >24 | >24 | >24 | >24 |
| Laminate Structure | Prelam Al/ GF-19 | Nylon/mPET/ 4 mil PE | Prelam Al/ GF-19 | Prelam Al/ GF-19 | Prelam Al/ GF-19 | Prelam Al/ 2 mil CPP |
| Green bond, g/inch | 221 (AS) | 176 (AS) | 183 (AS) | 216 (AS) | 263 (AS) | 171 (AS) |
| 1-day bond, g/inch | 1310 (FT) | 3487 (FT) | 1373 (FT) | 1253 (FT) | 1389 (FS) | 1895 (FS) |
| 7-day bond, g/inch | 1265 (FT) | 3577 (FT) | 1339 (FT) | 1379 (FT) | 1295 (FS) | 1803 (FS) |
| 14-day bond, g/inch | 1260 (FT) | 3503 (FT) | 1228 (FT) | 1354 (FT) | 1692 (FS) | 1352 (AS) |
| boil-in-bag, g/inch | 1099 (FS) No Tunnel | | 858 (AT) No Tunnel | 1119 (FS) No Tunnel | 1010 (AT) No Tunnel | 1028 (AT) No Tunnel |
| Aging, 1:1:1 sauce at 50° C. | 234 (AS) No Tunnel | | 121 (AS) No Tunnel | 123 (AS) No Tunnel | 748 (AT) No Tunnel | 1046 (AT) No Tunnel |
| Aging, softener at 65° C. | | 565 (FT) No Tunnel | | | | |
| Retort, migolyol at 121° C. 2 hours | | | | | | Inseparable. No Tunnel |

| | Example 7 | Example 8 | Example 9 | Example 10 | Comparative Example 1 | Comparative Example 2 |
|---|---|---|---|---|---|---|
| Isocyanate Component | | | | | | |
| NCO content, % | 12.4 | 12.4 | 12.4 | 12.4 | 11.96 | 12.5 |
| Equivalent weight of the polyol blend | 186 | 186 | 186 | 186 | 186 | 173 |
| Polyester content in the polyol blend, | <50% | <50% | <50% | <50% | <50% | <50% |
| Polyol Component | | | | | | |
| Equivalent weight of polyester component(s) | 1211 | 1211 | 1211 | 1211 | 1219 | 1451 |
| Polyester content | >50% | >50% | >50% | >50% | >50% | >50% |
| Adhesion Promoters | Phosphate ester | Phosphate ester | Phosphate ester | Phosphate ester | GLYMO | Other |
| Adhesive Properties | | | | | | |
| NCO/OH Index | 1.15 | 1.35 | 1.35 | 1.35 | 1.53 | 1.34 |
| Theoretical functionality | 2.21 | 2.20 | 2.20 | 2.20 | 2.41 | 2.00 |
| Solid Content, % | 50 | 50 | 50 | 50 | 50 | 50 |
| Initial Viscosity by Zahn Cup #2, seconds | 14.7 | 14.7 | 14.7 | 14.7 | 14.0 | 14.0 |
| Potlife, hours | >24 | >24 | >24 | >24 | <16 | >24 |
| Laminate Structure | Nylon/mPET/ 4 mil PE | Prelam Al/ GF-19 | Prelam Al/ 2 mil CPP | Nylon/mPET/ 4 mil PE | Prelam Al/ GF-19 | Prelam Al/ GF-19 |
| Green bond, g/inch | 353 (AS) | 211 (AS) | 104 (AS) | 182 (AS) | 260 (AS) | 370 (AS) |
| 1-day bond, g/inch | 2959 (FT) | 1189 (FT) | 1553 (FS) | 3241 (FT) | 450 (AS) | 1236 (FS/FT) |
| 7-day bond, g/inch | 3005 (FT) | 1357 (FT) | 1932 (FS) | 2273 (FT) | 490 (AS) | 1182 (FT) |
| 14-day bond, g/inch | 2218 (FT) | 2321 (FT) | 1662 (FS) | 3332 (FT) | 583 (FT) | 1251 (FT/FS) |
| boil-in-bag, g/inch | | 950 (AT) No Tunnel | 1124 (AT) No Tunnel | | Delaminated | Tunneling |
| Aging, 1:1:1 sauce at 50° C. | | 513 (AT) No Tunnel | 1098 (AT) No Tunnel | | | Tunneling |
| Aging, softener at 65° C. | 561 (AS) No Tunnel | | | 675 (AS) No Tunnel | | |
| Retort, migolyol at 121° C. 2 hours | | | Inseparable. No Tunnel | | | |

IE1 through IE10 exhibit improved processing characteristics, such as low viscosity and long pot life at 50% or more solids content, and enhanced performance as evidenced by good green bond, superior bond strength, and excellent temperature and chemical resistance in boil-in-bag, chemical aging, and retort tests.

To the contrary, CE1 exhibits poor bond strength and poor temperature/chemical resistance as evident by the boil-in-bag test result due to higher than desired functionality in the adhesive even though it contains similar components as IE1 through IE10. As the structure failed boil-in-bag test, it was not subjected to more aggressive tests, such as aging at 50° C. for 100 hours and retort at 121° C. for 2 hours. CE2, while exhibiting good bond strength, exhibits poor temperature and chemical resistance as the laminate fails both the boil-in-bag and chemical aging test at 50° C. for 100 hours due to lower than desired functionality in the adhesive even though it contains similar components as IE1 through IE10.

The invention claimed is:
1. A two-component adhesive composition, comprising:
an isocyanate component comprising an isocyanate prepolymer that is the reaction product of:

a polyisocyanate; and
an isocyanate reactive component having an average molecular weight less than 1,500, comprising a polyester polyol and a polyether polyol, wherein the polyether polyol comprises at least 50 wt % of the isocyanate reactive component;
a polyol component comprising a polyester polyol having an average molecular weight greater than 1,500, wherein the polyester polyol comprises at least 30 wt % of the polyol component, based on the dry weight of the polyol component, and the polyol component further comprises one or more low molecular weight glycols selected from ethylene glycol, diethylene glycol, triethylene glycol, propylene glycol, trimethylene glycol, 1,3-butanediol, 1,4-butanediol, 1,6-hexanediol, trimethylolpropane, triisopropanolamine, and neopentylglycol; and
an adhesion promoter,
wherein the average functionality of the adhesive composition is greater than 2 but less than 2.41 wherein the adhesive composition further comprises a solvent.

2. The composition of claim 1, further comprising an initial viscosity at room temperature from 10 seconds to 22 seconds when mixed at a NCO/OH index from 1.0:1.0 to 2.5:1.0 to form a solution with a solids content at 50%.

3. The composition of claim 1, wherein the polyester polyols are the reaction product of polyhydric alcohols and polybasic acids.

4. The composition of claim 1, wherein the NCO content of the isocyanate component without solvent is from 9 to 18%.

5. The composition of claim 1, wherein the NCO content of the isocyanate component without solvent is from 11 to 15%.

6. The composition of claim 1, wherein the isocyanate reactive component has an average molecular weight from 250 to 1,200.

7. The composition of claim 1, further comprising an additive selected from the group consisting of a catalyst, a surfactant, a leveling agent, a defoamer, a rheology modifier, a color pigment, and mixtures of two or more thereof.

8. The composition of claim 1, wherein the solvent is selected from the group consisting of ethyl acetate, methyl ether ketone, toluene, and mixture of two or more thereof.

9. The composition of claim 1, wherein the isocyanate component further comprises a polyisocyanate selected from the group consisting of aromatic polyisocyanates, aliphatic polyisocyanates, cycloaliphatic polyisocyanates, and mixtures of two or more thereof.

10. The composition of claim 1, wherein the polyisocyanate is selected from the group consisting of 1,3- and 1,4-phenylene diisocyanate, 1,5-naphthylene diisocyanate, 2,6-tolulene diisocyanate (2.6-TDI), 2,4-tolulene diisocyanate (2,4-TDI), 2,4'-diphenylmethane diisocyanate (2,4'-MDI), 4,4'-diphenylmethane diisocyanate (4,4'-MDI), polymeric isocyanates, 3,3'-Dimethyl-4,4'-Biphenyldiisocyanate (TODI), and combinations of two or more thereof.

11. The composition of claim 1, wherein the polyisocyanate is selected from the group consisting of cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and combinations of two or more thereof.

12. The composition of claim 1, wherein the polyisocyanate is selected from the group consisting of 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane, and combinations of two or more thereof.

13. The composition of claim 1, wherein the adhesion promoter is selected from phosphoric acid, polyphosphoric acid, phosphate ester, silane, and mixtures of two or more thereof.

14. The composition of claim 3, wherein the polyhydric alcohol is selected from the group consisting of a glycol, a polyester, a polyether, and mixtures of two or more thereof.

15. The composition of claim 3, wherein the polybasic acid is selected from the group consisting of polycarboxylic acid, polycarboxylic anhydride, isophthalic acid, terephthalic acid, and mixtures of two or more thereof.

16. A method for making a laminate structure comprising the adhesive composition of any of claim 1, the method comprising:
mixing the isocyanate component and the polyol component at a stoichiometric ratio (NCO/OH) from 1 to 2.5 to form a curable adhesive mixture;
dissolving the curable adhesive mixture in a solvent to form a coatable adhesive mixture;
coating the coatable adhesive mixture on a surface of a first substrate;
bringing a surface of a second substrate into contact with the surface of the first substrate under pressure to form a laminate structure; and
curing the laminate structure.

17. A laminate formed by the method of claim 16.

* * * * *